United States Patent [19]
Stegmuller

[11] Patent Number: 4,810,159
[45] Date of Patent: Mar. 7, 1989

[54] BATCHING SYSTEM

[76] Inventor: Rudi Stegmuller, 56 Silverboomkloof Rd., Somerset West, Cape Province, South Africa

[21] Appl. No.: 924,439

[22] Filed: Oct. 29, 1986

[30] Foreign Application Priority Data

Nov. 6, 1985 [ZA] South Africa ........................ 85/8535

[51] Int. Cl.[4] ................................................ B60P 1/64

[52] U.S. Cl. .................................... 414/498; 222/135; 222/200; 414/325; 414/326; 414/332; 414/919

[58] Field of Search ............... 414/332, 469, 498, 919, 414/304, 311, 325, 326, 287; 222/135, 144.5, 200, 564; 198/533; 220/22

[56] References Cited

U.S. PATENT DOCUMENTS

| | | | |
|---|---|---|---|
| 2,606,676 | 8/1952 | Dempster | 414/469 |
| 2,704,221 | 3/1955 | Gwinn, Jr. | 298/22 D |
| 3,497,109 | 2/1970 | Leach | 222/144.5 |
| 3,610,485 | 10/1971 | Van Raden | 222/564 |
| 3,766,664 | 10/1973 | Burgin | 414/287 X |
| 3,915,343 | 10/1975 | Barcock | 222/564 X |
| 3,924,783 | 12/1975 | Ward | 220/22 X |
| 4,346,802 | 8/1982 | Popper | 198/533 |

FOREIGN PATENT DOCUMENTS

| | | | |
|---|---|---|---|
| 3312508 | 10/1984 | Fed. Rep. of Germany | 414/919 |
| 3610263 | 10/1986 | Fed. Rep. of Germany | 414/919 |
| 36630 | 7/1930 | France | 222/200 |
| 60-045 | 4/1985 | Japan | 414/498 |
| 610758 | 6/1978 | U.S.S.R. | 222/200 |
| 842477 | 7/1960 | United Kingdom . | |
| 2183613 | 6/1987 | United Kingdom | 222/200 |

*Primary Examiner*—Robert J. Spar
*Assistant Examiner*—Stuart J. Millman
*Attorney, Agent, or Firm*—James E. Brunton

[57] ABSTRACT

An apparatus for use in the transportation and production of cementitious mixes including a silo and a truck for transporting the silo. The silo is sub-divided internally into two compartments, one for cement and one for sand. At the lower end of the said compartment there is a vibratory grid and other structure for causing the sand to flow evenly from the open lower end of the silo into a mixer without bridging. A feed screw feeds cement from the cement compartment to the mixer. The truck has a lifting mechanism for lifting the vertical silo and tilting the silo through ninety degrees to a horizontal position for transportation purposes.

6 Claims, 6 Drawing Sheets

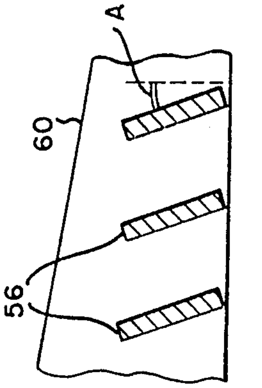
FIG. 3
FIG. 4
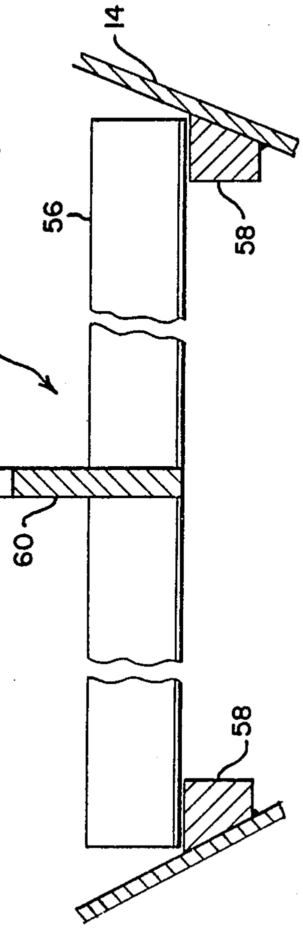
FIG. 2
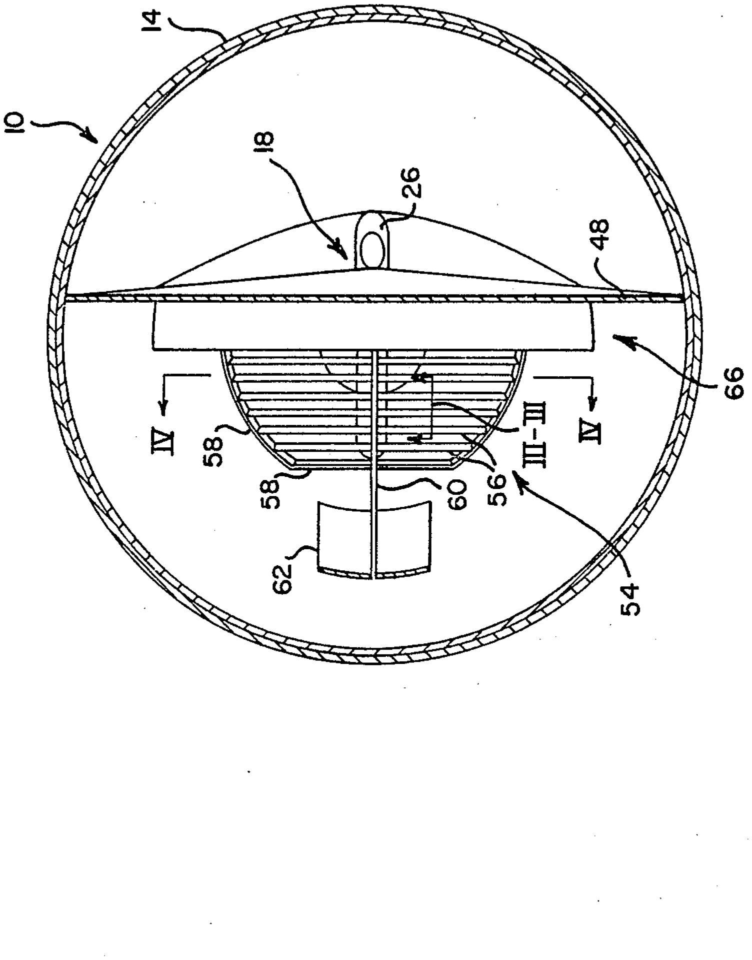

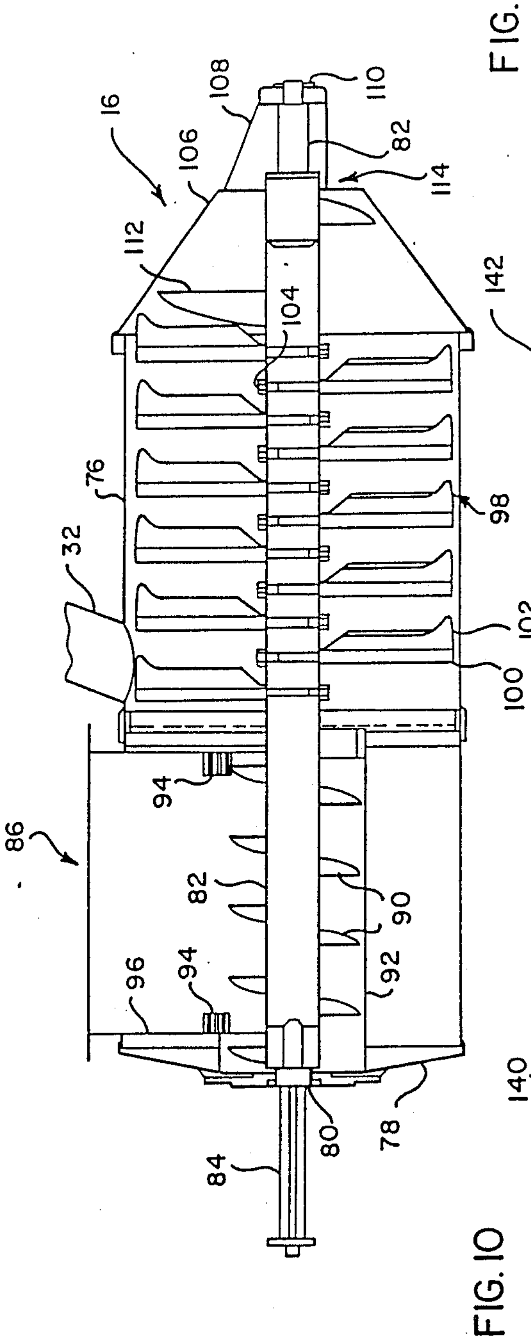
FIG. 10
FIG. 5
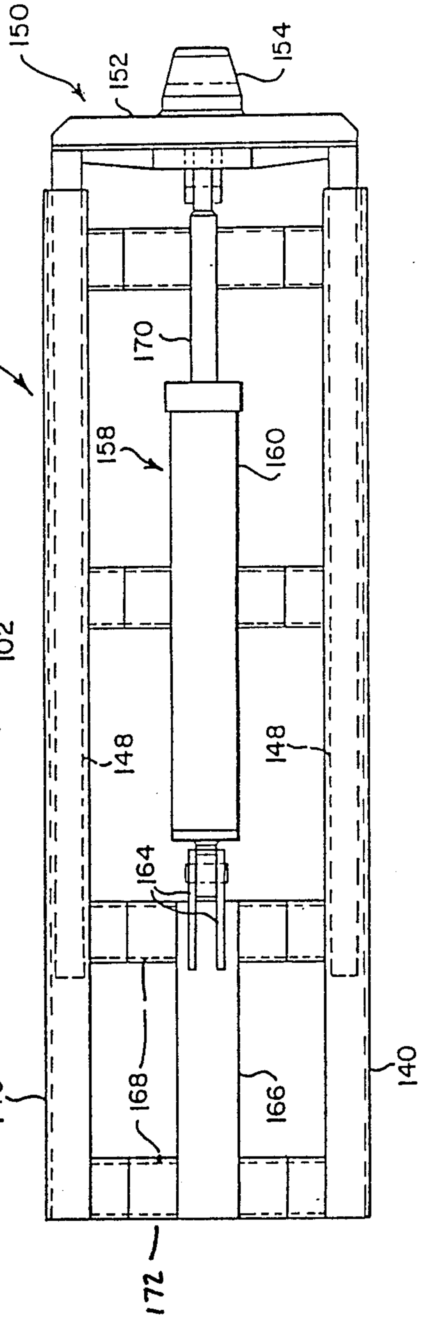

BATCHING SYSTEM

BACKGROUND OF THE INVENTION

1. Field of the Invention

The present invention relates generally to systems for the transportation, storage and production of cementitious mixtures. More particularly the invention concerns a silo for containing sand and cement and an apparatus for transporting the silo.

2. Discussion of the Invention

In the past, concrete has been provided at the job site generally in one of two ways. In the so-called "ready mix" method, the concrete is delivered to the job site in large mixer trucks which mix the concrete in transit. In accordance with this method, the concrete is delivered in a ready mixed, ready to use form. While the "ready mix" method is convenient, it is usually quite expensive and substantial delays can occur if the supplier of the concrete does not maintain agreed upon schedules. Further, by this method direct control by the general contractor of the character and quality of the mix is lost.

The second general method of obtaining concrete at the job site involves the actual mixing of the concrete at the site using materials which have previously been delivered and stored on site. This method presents several problems. In the first place, the addition of cement to the aggregate is usually done manually and is difficult to control with the required degree of accuracy. Also the sand usually has to be dried completely so that the correct mix proportions can be achieved. The drying of the sand is a time consuming and costly process. Transportation of the cement and aggregate is also a problem in many cases.

The present invention provides a meaningful alternative to the commonly practiced prior art methods and uniquely solves the problems inherent in these methods.

As will be discussed in greater detail hereinafter, in accordance with the present invention, there is provided a uniquely configured silo for storing precise volumes of sand or other aggregate and a binder such as cement. Also provided is a truck for transporting the silo and a novel lifting mechanism for manipulating the silo.

SUMMARY OF THE INVENTION

According to one aspect of the present invention there is provided a silo of the character previously discussed which comprises a vibratory screen at or near the bottom thereof. The vibratory screen includes a series of horizontally extending, horizontally spaced, screen bars extending across the interior of the silo. Each end of each screen bar rests on a support extending along the inner periphery of the silo. Additionally, vibratory means are provided for imparting vibratory forces to the screen bars at regions thereof intermediate their ends.

In one form of the invention the vibratory means includes a transverse member extending transversely to the screen bars, the transverse member having a vibrator connected to it. Preferably the transverse member extends through the wall of the silo, with the vibrator being located on the outside of the silo.

In one constructional form of the invention the silo includes an upright cylindrical wall portion and an upright internal partition dividing the interior of the silo into a first compartment for containing cement/binder and a second compartment for containing sand. In this form of the invention the vibratory screen is located at the lower end of the second compartment and the partition is inclined to the vertical so that the horizontal cross-sectional area of the second compartment increased downwardly over at least part of the height of the cylindrical wall portion.

To promote flow of sand, the silo can further comprise a sand deflector which is mounted on the partition at a level above the screen, the deflector comprising a plate which slopes downwardly from the partition and overhangs the screen.

According to another aspect of the present invention, there is provided a truck including a lifting gear for a silo, the lifting gear comprising a main frame which is pivotally mounted on the rear of the truck's chassis for swinging movement about a transverse horizontal axis, a sub-frame carried by and telescopic with respect to said main frame, swinging means for swinging the frames about the transverse horizontal axis between a horizontal position in which the frames overlie the chassis and an upright position in which the frames are disposed rearwardly of the chassis, displacing means for displacing the sub-frame vertically with respect to the main frame while the main frame is in its upright position and two formations which are carried by the sub-frame and are vertically spaced while the sub-frame is upright, the formations serving to engage with and locate a silo both while the sub-frame is being moved vertically with respect to the main frame and while the sub-frame and main frame are being displaced about the axis.

In a preferred form of the invention the formation which is uppermost when the sub-frame is upright comprises an upwardly open pocket, and the lowermost formation comprises a downwardly open pocket.

The means for displacing the sub-frame with respect to the main frame can comprise an hydraulic cylinder connected between the sub-frame and the main frame and extending along the central longitudinal axis of said truck. It is preferred that the means for swinging the frames comprise a pair of hydraulic cylinders which are mounted outwardly of said main frame, the main frame including a pair of brackets which protrude downwardly therefrom and to which the rods of said cylinders are pivotally connected and there being brackets secured to the bodies of said cylinders and extending downwardly therefrom, these brackets being pivotally mounted on the chassis of said vehicle, the horizontal axis about which said rods are pivotal with respect to the first mentioned brackets being above the horizontal axis about which the second mentioned brackets are pivotal with respect to the vehicle chassis.

The present invention also provides the combination of a truck as defined above, and a silo having a first compartment for sand, a second compartment for cement/binder, and first and second formations for cooperation with said vertically spaced formations of the sub-frame whereby said silo and said sub-frame are, in use, attached to one another at two vertically spaced locations. Where the formations of the sub-frame include pockets, the first formation of the silo can be in the form of a horizontal bar which is spaced outwardly from the silo wall and is received in said upwardly open pocket as the sub-frame moves upwardly with respect to said main frame, and the second formation of the silo can be in the form of an upward projection which is received in said downwardly open pocket.

BRIEF DESCRIPTION OF THE DRAWINGS

FIG. 2 is a horizontal section, the section being on line II—II in FIG. 1.

FIG. 3 is a vertical section, to a larger scale, of part of a vibratory screen of the silo, the section being on line III—III in FIG. 2.

FIG. 4 is a vertical section taken on line IV–IV of FIG. 2.

FIG. 5 is a vertical section through a cement and sand mixer.

FIG. 10 is a top plan view of the silo lifting gear of the truck.

DESCRIPTION OF THE INVENTION

Figure 1:
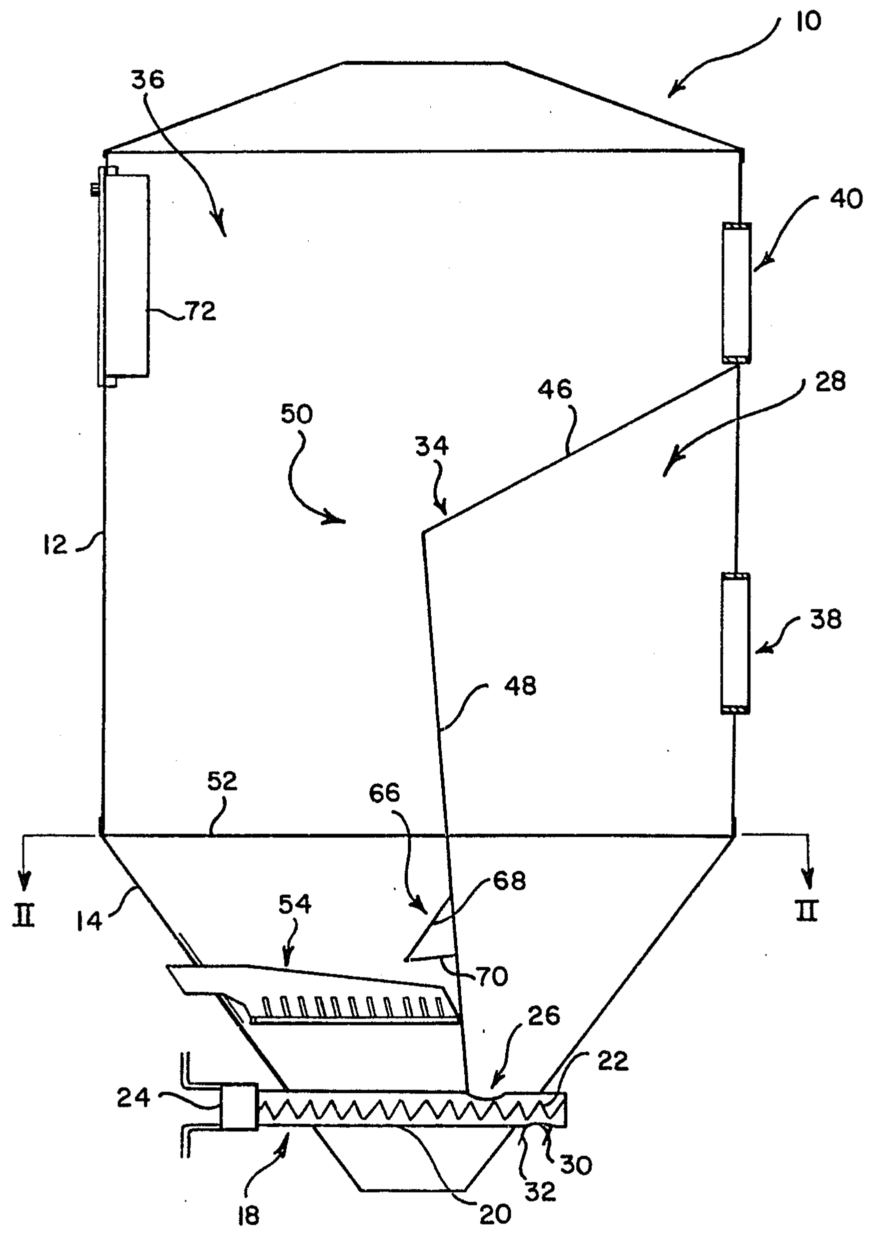
FIG. 1 is a diagrammatic vertical section through a silo.
Figure 6:
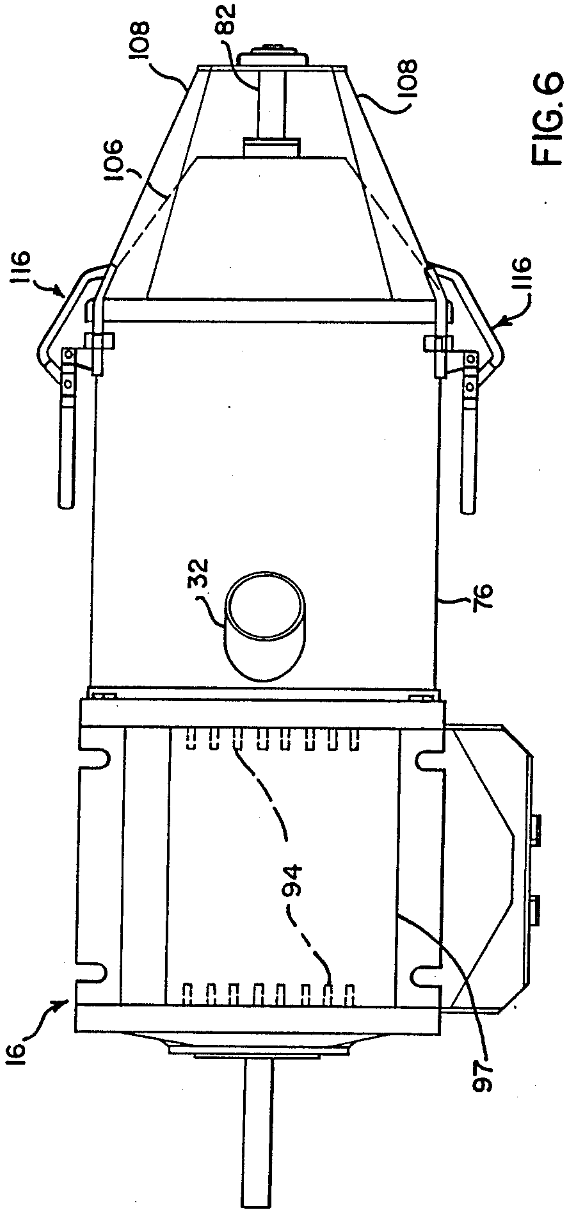
FIG. 6 is a top plan view of the mixer of FIG. 5.

Referring to the drawings and particularly to FIGS. 1 through 8, reference numeral 10 generally indicates a silo which comprises a hollow body portion, including an upper cylindrical portion 12 and a lower frusto-conical portion 14. At the bottom of the frusto-conical portion 14 there is mounted a mixer 16, the mixer 16 being shown in FIGS. 5 and 6.

At a level above the bottom end of the frusto-conical portion 14 there is a cement feed device 18, this consisting of a tube 20 extending horizontally across the interior of the frusto-conical portion, an auger-type conveyor 22 rotatable inside the tube, and a variable speed hydraulic motor 24. The motor 24 is shown in elevation. The cement entrance to the tube 30 is designated 26 and places the interior of the tube 20 in communication with a cement storage compartment 28. The exit from the tube 20 is shown at 30 and communicates with a downwardly sloping tube 32 (FIGS. 5 and 6) which leads to the mixer 16.

Above the cement feed device 18 there is a partition 34 which divides the interior of the silo into a first compartment for a bonder such as cement and a second compartment for an aggregate such as sand. The cement compartment is designated 28 and the sand compartment is designated 36. Inlet openings for charging the first and second compartments with cement and sand respectively are provided at the side of the silo, the inlet opening for the compartment 28 being indicated at 38 (FIG. 1), and that for the compartment 36 being indicated at 40. In use, when the two compartments 28 and 36 are to be charged with cement and sand respectively, the silo is laid on its side so that the openings 38, 40 face upwardly. Cover plates 42, 44 (FIG. 8) closing the openings 38, 40 are removed and the compartments then filled. After replacing the cover plates, the silo is again stood up.

As will be seen in FIG. 1, the partition 34 has an upper section 46 which slopes downwardly at an angle slightly greater than the angle of repose of sand. This ensures that no sand remains behind on the upper section 46 as the compartment 36 empties. The partition 34 further comprises a lower section 48 extending downwardly from the lower end of the upper section 46, the lower section 48 being slightly inclined to the vertical whereby the cross-sectional area of the compartment 36, from a throat at the level indicated by reference numeral 50, increases downwardly until the level at which the cylindrical portion 12 of the silo 10 meets the frusto-conical portion 14, i.e. at the level indicated by reference numeral 52.

Slightly above the cement feed device 18, in the second compartment 36, there is provided a vibratory screen 54 (see FIGS. 1 to 4). The vibratory screen comprises a series of horizontally extending, horizontally spaced, mutually parallel, flat screen bars 56 extending across the compartment 36. Provided within the silo are support means for supporting the screen bars comprising ledges formed by a member 58 extending around the inner periphery of the compartment 36. As best seen in FIG. 2, these ledges support the ends of screen bars 56. The member 58 is welded to the frusto-conical portion 14 of the silo 10. As will be seen from FIG. 2, the member 58 has a central straight section which is spaced from the interior periphery of the portion 14.

The vibratory screen 54 further comprises a mounting plate 60, each screen bar 56 being welded to the mounting plate 60. As will be seen in FIGS. 2 and 4, each screen bar 56 is secured to the mounting plate 60 at a point mid-way between the ends of the respective screen bar. One end of the mounting plate 60 extends through an opening in the wall 14 of the frusto-conical portion 14 of the silo. The part of the plate 60 which is outside the compartment 36 has a support plate 62 secured thereto. On the plate 62 there is mounted vibrating means comprising a vibrator 64 (not shown in FIG. 1 but shown in FIG. 8).

As will be seen from FIG. 3, the screen bars 56 extend at an angle A of about 15° to the vertical.

Immediately above the vibratory screen 54 there is provided a deflector 66, this being secured to the lower section 48 of the partition 34. The deflector 66 comprises a horizontally elongate, downwardly sloping upper plate 68 and a similarly arranged, but less steeply inclined, lower plate 70. The plates 68 and 70 and the partition 34 define a hollow triangular structure the forward, lower edge of which overhangs the vibratory screen 54.

Within the upper part of the compartment 36 there is a water tank 72. The inlet to the tank 72 is controlled by a float operated valve (not shown). This valve ensures that the water level within the tank 72 remains constant. The tank 72 has an inlet (not shown) for connection to a supply of water under pressure, said valve controlling flow of water into the tank from said inlet. The tank also has an outlet pipe 74 which leads down to the mixer 16. The provision of the tank 72 ensures that a constant head of water is maintained which is not subject to inlet pressure variations.

The mixer 16 (FIGS. 5 and 6) comprises a cylindrical casing 76 closed at one end by a plate 78 at the center of which there is a bearing 80 for a shaft 82. The shaft 82 is driven by a hydraulic motor (not shown) mounted on the extension 84 of the shaft 82.

The casing 76 has an inlet 86 in the upper part thereof, the inlet 86 communicating with the outlet 88 (see Figure at the lower end of the frusto-conical portion 14. Feed blades 90 are mounted on the part of the shaft 82 which is below the inlet 86, this part of the shaft being within an open-topped part-cylindrical shell 92 which fits closely around the blades 90.

Two axially spaced part-cylindrical arrays of short bars 94 are provided above the shell 92 and on the side walls of a chute 96 leading down from the inlet 86 to the open top of the shell 92.

To the right of the blades 90, as viewed in FIG. 5, the shaft 82 carries a series of mixer blades 98. Each blade 98 comprises a base element 100 and a wear part 102. The base elements 100 pass through the shaft 82 and the protruding portions have nuts 104 screwed onto them. By loosening the nuts 104, the blades 98 can be rotated so as to change their angles. The wear parts 102 can be mounted on the base elements 100 in any suitable manner which facilitates quick removal thereof.

The end of the casing 76 remote from the plate 78 has an open ended cone 106 mounted thereon. Brackets 108 extend forwardly from the cone 106 and carry a bearing 110 for the forward end of the shaft 82. Feed blades 112 are carried by the part of the shaft 82 which is within the cone 106. The blades 112 feed the mixed sand and cement through the annular opening 114 which encircles the shaft 82.

The cone 106 is releasably secured to the casing 76 by means of quick release toggle mechanisms 116 which are mounted on the casing 76 and engage with suitable abutment surfaces of the cone 106.

By releasing the toggle mechanisms 116 and removing the cone 106, and hence the brackets 108, access can be had to the shaft 82. The entire shaft 82 and all the blades carried thereby can then be slid out of the casing 76 (to the right as illustrated in FIG. 5) for repair and maintenance purposes.

Figure 8:
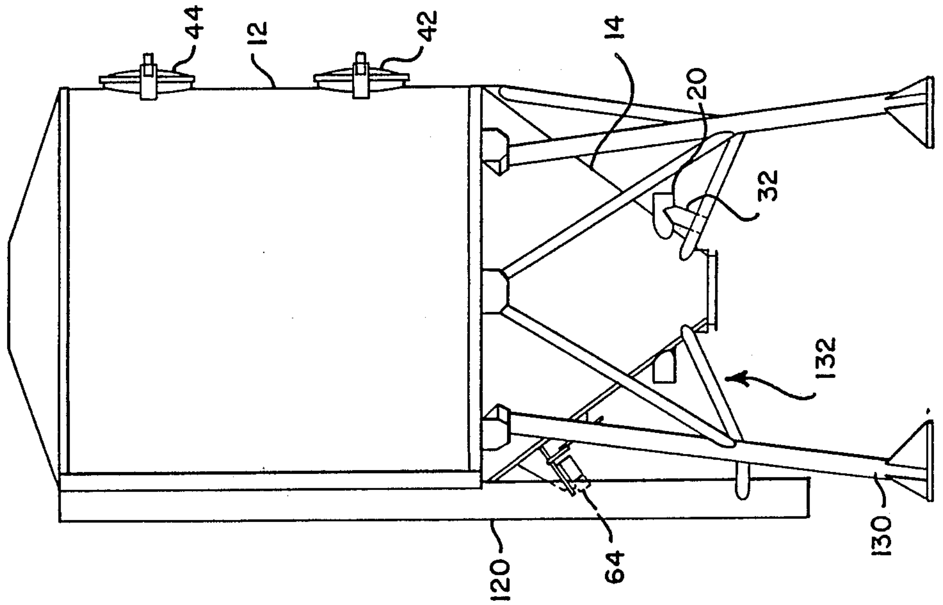
FIG. 8 is a further elevation of the silo, the elevation of FIG. 8 being at right angles to the elevation of FIG. 7.
Figure 7:
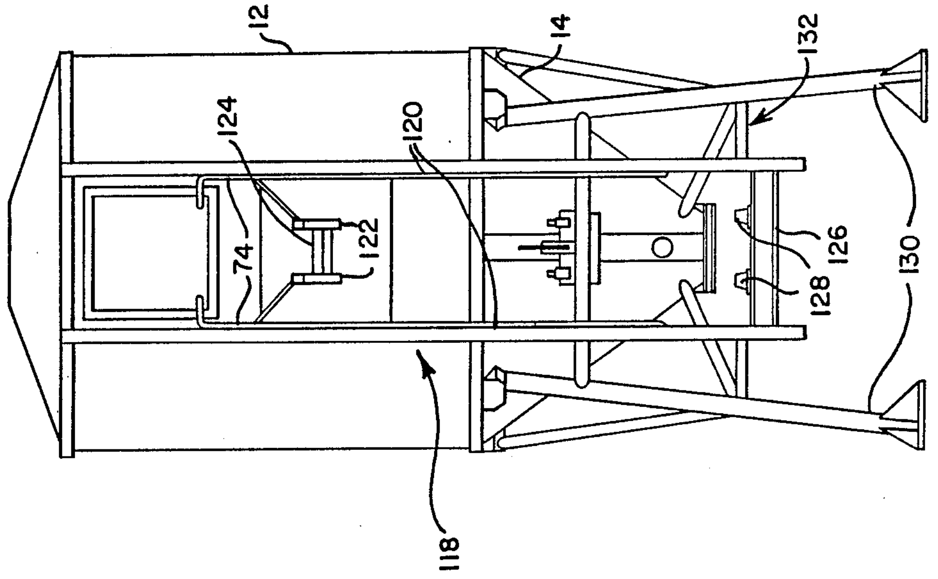
FIG. 7 is an elevation of the silo.

Turning now to FIGS. 7 and 8, the silo is provided with a structure, generally indicated at 118, which enables it to be lifted by the truck mounted lifting gear which will be described hereinafter. The structure 118 comprises two vertically extending members 120 on which is mounted, by means of brackets shown at 122, a horizontal cross bar 124. A horizontal beam 126 spans between the members 120 close to the lower ends of the members 120. Mounted on the upper face of the beam 126 are two latching projections 128.

The silo is, when vertical, supported by four legs 130 and there is a frame structure generally indicated at 132 which braces the legs 130 and mounts various other components. The frame structure 132 will not be described in detail.

Figure 9:
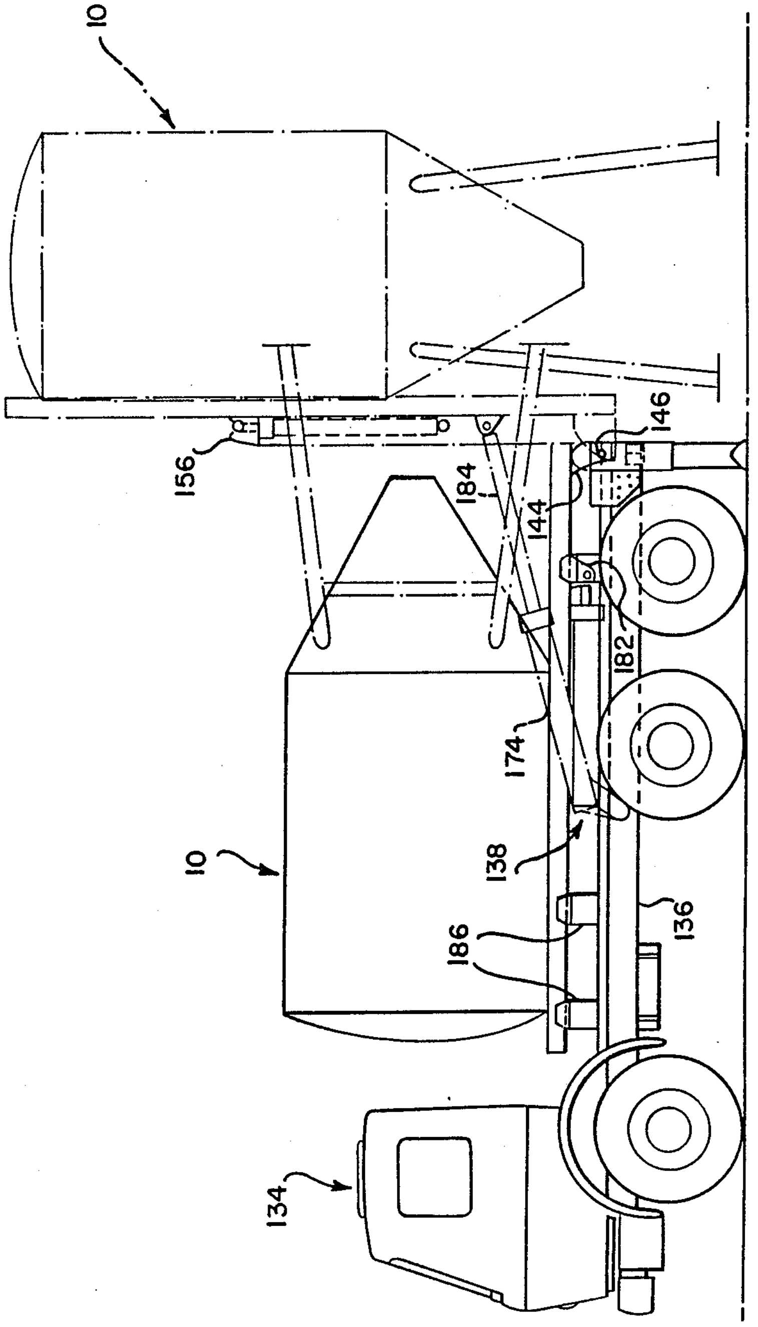
FIG. 9 is an elevation of a truck carrying a silo, the silo being shown in two positions.

In FIG. 9 there is illustrated a truck 134 having chassis 136. The silo 10 is illustrated in two positions i.e. a vertical position in which it has been lifted slightly clear of the ground and a horizontal position in which it is supported by the truck for transportation purposes.

Figure 11:
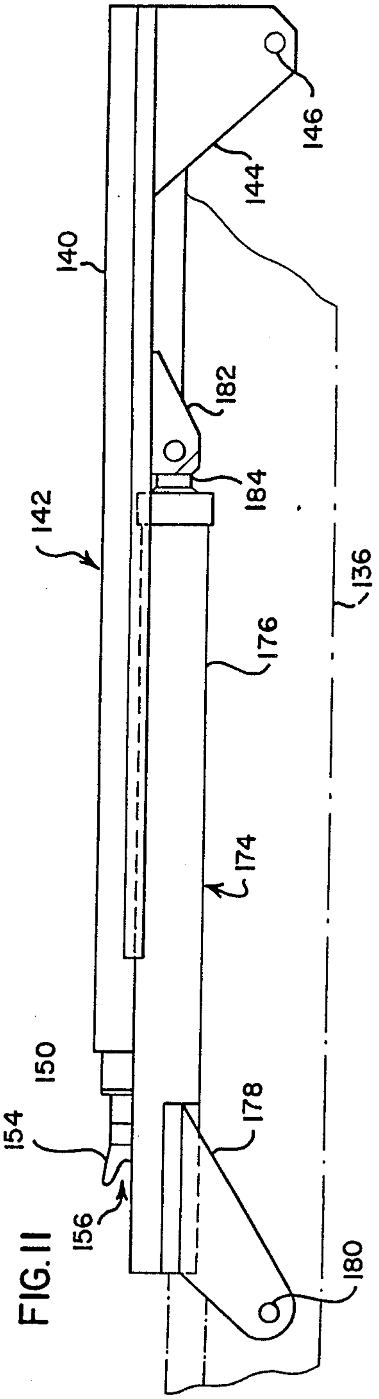
FIG. 11 is a side elevation of the lifting gear of FIG. 10.

The lifting means of the truck 134 is generally designated 138 and is shown in more detail in FIGS. 10 and 11. In the present form of the invention, the lifting means comprises a pair of side frame members 140 forming part of a main frame 142. Brackets 144 depend from the rear ends of the side frame members 140. Pivotal mountings 146 secure the brackets 144 to the rear of the chassis 136 for swinging movement between the horizontal position shown in full lines in FIG. 9 and the vertical position shown in dotted lines in FIG. 9. The members 140 are of box-section and the longitudinal members 148 of a sub-frame designated 150 slide telescopically in the longitudinal members 140. The end parts of the longitudinal members 148 which are outside the side frame members 140 are joined by a cross beam 152. The beam 152 has mounted thereon a block 154 which defines an upwardly open lifting pocket 156 (see particularly FIG. 9).

An hydraulic cylinder 158 has its body 160 pivotally mounted at 162 on two spaced brackets 164 which are themselves mounted on a longitudinal member 166. The longitudinal member 166 is in turn mounted on cross members 168 forming part of the main frame 142. The rod 170 of the cylinder 158 is secured to the beam 152. It will be understood that extension and retraction of the rod 170 causes the sub-frame 150 to slide telescopically with respect to the main frame 142.

On the left hand end of the sub-frame 150 there is mounted a structure generally designated 172 and which provides a pair of open pockets for receiving the projections 128 of the silo.

The main frame 142 is tilted about the pivotal mountings 146 by swinging means comprising a pair of laterally spaced double acting hydraulic cylinders 174. The body 176 of each hydraulic cylinder 174 is secured to a bracket 178 which protrudes downwardly from the body 176. The brackets 178 are pivotally mounted at 180 on the chassis 136.

Brackets 182 extend downwardly from the underside of the side frame members 140 and the rods 184 of the cylinders 174 are pivotally secured to the lower ends of these brackets.

Supports 186 (FIG. 9) are mounted on the chassis 136 for supporting the members 120 when the silo 10 is horizontal.

In use of the system described above the silo 10 is filled at a depot. More specifically, the cover plates 42 and 44 are opened and the compartments 28 and 36 are respectively charged with cement and sand through the openings 38 and 40. This is done while the silo is horizontal. The openings 38 and 40 are then closed again by the cover plates 42 and 44 and the silo stood up.

When the silo is to be taken to a building site, the truck 134 is backed up to it with the lifting means 138 horizontal i.e. lying on the chassis 136. Once the truck is properly positioned with respect to the silo, the swinging means comprising the cylinders 174 are actuated so that the main frame 142 (carrying the sub frame 150 with it) tilts upwardly about the pivotal mountings 146. Tilting continues until the side frame members 140 are vertical and adjacent the cylindrical portion 20 of the silo. The dimensions of the components are such that the block 154 is now just below the crossbar 124 and the projections 128 are just below the structure 172. The displacing means comprising central hydraulic cylinder 158 is then actuated to displace the sub-frame 150 vertically with respect to the main frame 142. The block 154 engages the cross bar 124 which then seats in the pocket 156. The entire silo 10 is lifted vertically (to the position shown in chain dotted lines in FIG. 9) which causes the projections 128 to enter the now downwardly facing pockets of the structure 172. The hydraulic cylinders 174 are then retracted to swing the main frame 142 in an anti-clockwise arc (as viewed in FIG. 9) so that the silo is then horizontal and supported by the side frame members 140. In this condition it can be driven to the building site.

At the building site, the procedure described above is reversed. More specifically, the hydraulic cylinders 174 are extended until the side frame members 140 are again vertical. At this stage the silo is slightly above ground level. The hydraulic cylinder 158 is then retracted so that the sub-frame 150 moves downwardly with respect to the main frame 142 until the silo legs 130 reach the ground to support the silo. Continued downward movement of the sub-frame 150 lowers the block 154 to a level below the cross bar 124 and the projections 128 move downwardly out of the pockets of the structure 172. The silo and lifting gear are now entirely disconnected from one another. The truck can then be driven away and the main frame swung back to its horizontal position.

Before the mortar mix can be produced, the water tank 72 is filled so as to provide a constant supply. The hydraulic motors of the cement feed device 18 and of the mixer 16 are then started, as is the vibrator 64. The ratio of cement to sand is controlled by varying the speed of operation of the hydraulic motor 24. The vibrating screen 58 and the deflector 66 ensure that sand flows at a constant rate from the compartment 36 to the inlet 86 of the mixer 16. The blades 90 feed the sand falling into the shell 92 forwardly into the main mixing zone. Cement entering through the tube 32 is dispersed throughout the sand by means of the blades 98. The blades, being angled, also feed the cement/sand mixture forward into the cone 106, and the blades 112 then feed the mix out of the cone through the annular opening 114.

It is well known that sand is a material which, unless special provisions are made to prevent it, readily 'bridges' across an opening. The nature of the vibrating screen 54 and the provision of the deflector 66 has been found to ensure that, regardless of the nature of the sand or its moisture content, constant flow occurs.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for containing binder and aggregate comprising:

(a) a silo including a hollow body portion having a side wall, a top, a bottom and an internal partition dividing said body into a first compartment for containing a binder and a second compartment for containing aggregate;

(b) a vibratory screen disposed proximate the bottom of said second compartment, said vibratory screen including a plurality of generally horizontally extending, horizontally spaced screen bars extending across the interior of said silo;

(c) support means carried within said silo for supporting said screen bars, said support means comprising ledges formed around the inner periphery of said second compartment proximate the bottom thereof; and (d) vibrating means disposed exteriorly of said hollow body portion for imparting vibratory forces to said screen bars at regions thereof intermediate their ends.

2. An apparatus as defined in claim 1 in which said vibratory means comprises a transverse member extending transversely to said screen bars, each said screen bar being interconnected with said transverse member.

3. An apparatus as defined in claim 2 in which said internal partition is inclined to the vertical whereby the horizontal cross-sectional area of said second compartment increases downwardly over at least part of the height of said hollow body portion.

4. An apparatus as defined in claim 3 further comprising a sand deflector mounted on said partition at a location above said vibrating screen, said sand deflector comprising a first plate which slopes downwardly from said partition and overhangs said vibrating screen.

5. An apparatus as defined in claim 4 in which said sand deflector further comprises a second plate disposed below said first plate, said second plate also sloping downwardly from said partition at a lesser angle than said first plate, said second plate first joining said first plate along a generally horizontally extending apex.

6. A batching system comprising:

(a) a silo for containing binder and aggregate comprising:

(i) a silo including a hollow body portion having a side wall, a top, a bottom and an internal partition dividing said body into a first compartment for containing a binder and a second compartment for containing aggregate; and (ii) a vibratory screen disposed proximate the bottom of said second compartment, said vibratory screen including a plurality of generally horizontally extending horizontally spaced screen bars extending across the interior of said silo;

(c) support means carried within said silo for supporting said screen bars, said support means comprising ledges formed around the inner periphery of said second compartment proximate the bottom thereof; and (d) vibrating means for imparting vibratory forces to said screen bars a regions thereof intermediate their ends; and;

(e) a truck for lifting and transporting said silo including a chassis and lifting means for lifting said silo, said lifting means comprising:

(i) a main frame pivotally mounted on said chassis for swinging movement about a transverse horizontal axis;

(ii) a sub-frame carried by, and telescopic with respect to, said main frame;

(iii) swinging means carried by said chassis for swinging said main frame and said sub-frame about said transverse horizontal axis between a horizontal position in which said frames overlie said chassis and an upright position in which said frames are disposed rearwardly of said chassis;

(iv) displacing means for displacing said sub-frame vertically with respect to said main frame while said main frame is in its upright position; and (v) two silo engaging formations carried by said sub-frame, said formations being vertically spaced while sub-frame is upright, said formations serving to engage with and locate said silo both while said sub-frame is being moved vertically with respect to the main frame and while said sub-frame and main frame are being displaced about said axis.

* * * * *